United States Patent [19]

Blackburn

[11] Patent Number: 4,693,073
[45] Date of Patent: Sep. 15, 1987

[54] METHOD AND APPARATUS FOR STARTING A GAS TURBINE ENGINE

[75] Inventor: Ronald Blackburn, Rockford, Ill.
[73] Assignee: Sundstrand Corporation, Rockford, Ill.
[21] Appl. No.: 886,741
[22] Filed: May 27, 1986
[51] Int. Cl.⁴ ............................................ F02C 7/268
[52] U.S. Cl. ............................... 60/39.02; 60/31.142; 60/31.76
[58] Field of Search ............... 60/39.02, 39.142, 39.38, 60/39.76, 39.78, 39.79, 39.8, 39.81

[56] References Cited

U.S. PATENT DOCUMENTS 2,578,596 12/1951 Rieck .................................. 60/39.8

FOREIGN PATENT DOCUMENTS 2232025 1/1974 Fed. Rep. of Germany ..... 60/39.76

*Primary Examiner*—Louis J. Casaregola

*Attorney, Agent, or Firm*—Wood, Dalton, Phillips, Mason & Rowe

[57] ABSTRACT

Starters for gas turbine engines may be downsized or eliminated entirely by starting the turbine with a method including the steps of (a) combusting fuel in a combustion chamber for a limited period of time sufficient to provide combustion gas under pressure, (b) accelerating a turbine wheel 14 and a compressor 12 by expanding the gas from step (a) through the turbine wheel 14, (c) preventing the flow of combustion gas to the compressor by a valve 52 during the performance of steps (a) and (b), (d) following step (b) utilizing a portion of the kinetic energy of the accelerated turbine wheel 14 and compressor 12 to provide sufficient compressed air 88 to the combustion chamber 24 to scavenge and recharge the same and (e) repeating steps (a)–(d) inclusive until operation of the engine becomes self-sustaining.

4 Claims, 10 Drawing Figures

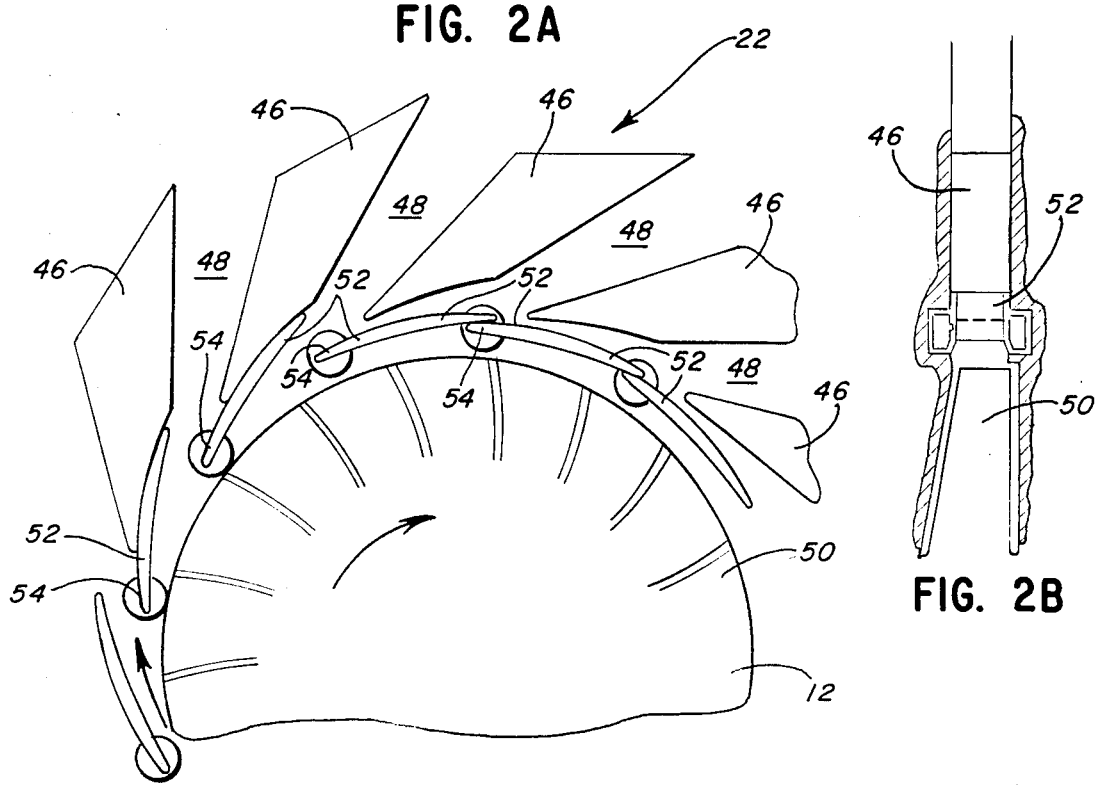
FIG. 2A
FIG. 2B
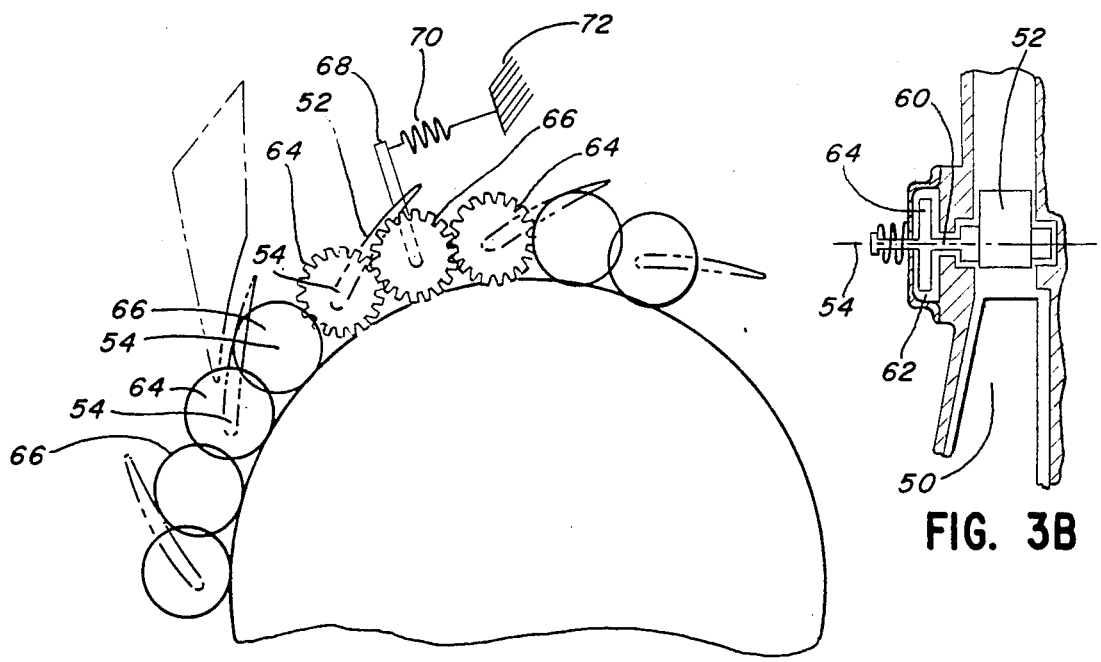
FIG. 3A
FIG. 3B

METHOD AND APPARATUS FOR STARTING A GAS TURBINE ENGINE

FIELD OF THE INVENTION

This invention relates to gas turbine engines, and more particularly, to the starting of such engines.

BACKGROUND OF THE INVENTION

Conventional gas turbine engines require a substantial amount of external energy during start-up in order to achieve an operating speed where the engine will self-sustain and then be capable of providing output power. In some instances, particularly with smaller engines, the weight and volume of a starting system can approach that of the basic engine itself, particularly when cold conditions are present, or if a fast start-up time is required, and/or there are ancillary drags present. Furthermore, surging (reverse air flow) is a troublesome characteristic in a gas turbine engine that presents difficulties during starting as well as during continuous full load operation.

The present invention is directed to overcoming one or more of the above problems.

SUMMARY OF THE INVENTION

It is one principal object of the invention to provide a new and improved method of starting a gas turbine engine. It is another object of the invention to provide a new and improved semi-constant volume cycle engine with improved starting apparatus.

According to one aspect of the invention, there is provided a method of starting a gas turbine engine having a turbine wheel mechanically coupled to a compressor and a combustion chamber provided with compressed air for combustion by the compressor and providing combustion gas under pressure to the turbine wheel to drive the same and thus drive the compressor. The method includes the steps of (a) combusting fuel in the combustion chamber for a limited period of time sufficient to provide combustion gas under pressure; (b) accelerating the turbine wheel and the compressor by expanding the gas from step (a) through the turbine wheel; (c) preventing the flow of combustion gas to the compressor during the performance of steps (a) and (b); (d) following step (b), utilizing a portion of the energy of the accelerated turbine wheel and compressor to provide sufficient compressed air to the combustion chamber to (1) scavenge and (2) recharge the same; and (e) repeating steps (a)–(d) inclusive until operation of the engine becomes self-sustaining.

In a preferred embodiment, step (c) of the method is performed with a valve means disposed between the compressor and the combustion chamber.

In the best mode contemplated, step (c) is performed with movable diffuser vanes disposed between the compressor wheel and the combustion chamber.

According to another aspect of the invention, there is provided a gas turbine engine including a rotatable compressor wheel, a rotatable turbine wheel, and a means coupling the wheels for conjoint rotation. A combustion chamber has an air inlet disposed to receive compressed air from the compressor, a fuel inlet for receipt of fuel to be oxidized, and a combustion gas nozzle disposed to provide combustion gas under pressure to the turbine wheel to rotate the same. Valve means are located between the compressor wheel and the combustion chamber to prevent flow of air or gas from the combustion chamber back through the compressor wheel. Means are provided for starting the engine and include means for periodically injecting and combusting fuel in the combustion chamber so as to create a pressurized gas therein and thereafter halting the injecting and combusting of fuel in the chamber so as to allow the pressurized gas to expand through the turbine wheel to accelerate the same followed by pressurization of air by the compressor wheel and the opening of the valve means so that the compressed air scavenges and recharges the combustion chamber.

In a preferred embodiment of the invention, the valve means is a check valve operable in response to an incipient pressure differential between the compressor wheel and the combustion chamber to prevent backflow.

Preferably, the check valve is a flapper valve and in a highly preferred embodiment, the flapper valve comprises plural flappers, each defined by a movable part of a diffuser vane.

The invention comtemplates that the starting means include a combustor pressure sensor such that operation of the system can be based on a pressure level, a given pressure decay rate as the combustion gas expands, or even based on a time period following some particular point in the combustion phase.

Other objects and advantages will become apparent from the following specification taken in connection with the accompanying drawings.

DESCRIPTION OF THE DRAWINGS

FIG. 2A is a fragmentary view of the outlet of the compressor section of the turbine;

FIG. 2B is a fragmentary view taken at right angles to the view shown in FIG. 2A;

FIG. 3A is a view similar to FIG. 2A but illustrating a modified embodiment of the invention;

FIG. 3B is a view similar to FIG. 2B but showing the modified embodiment with a slightly different spring arrangement than shown in FIG. 3A;

DESCRIPTION OF THE PREFERRED EMBODIMENT

Figure 1:
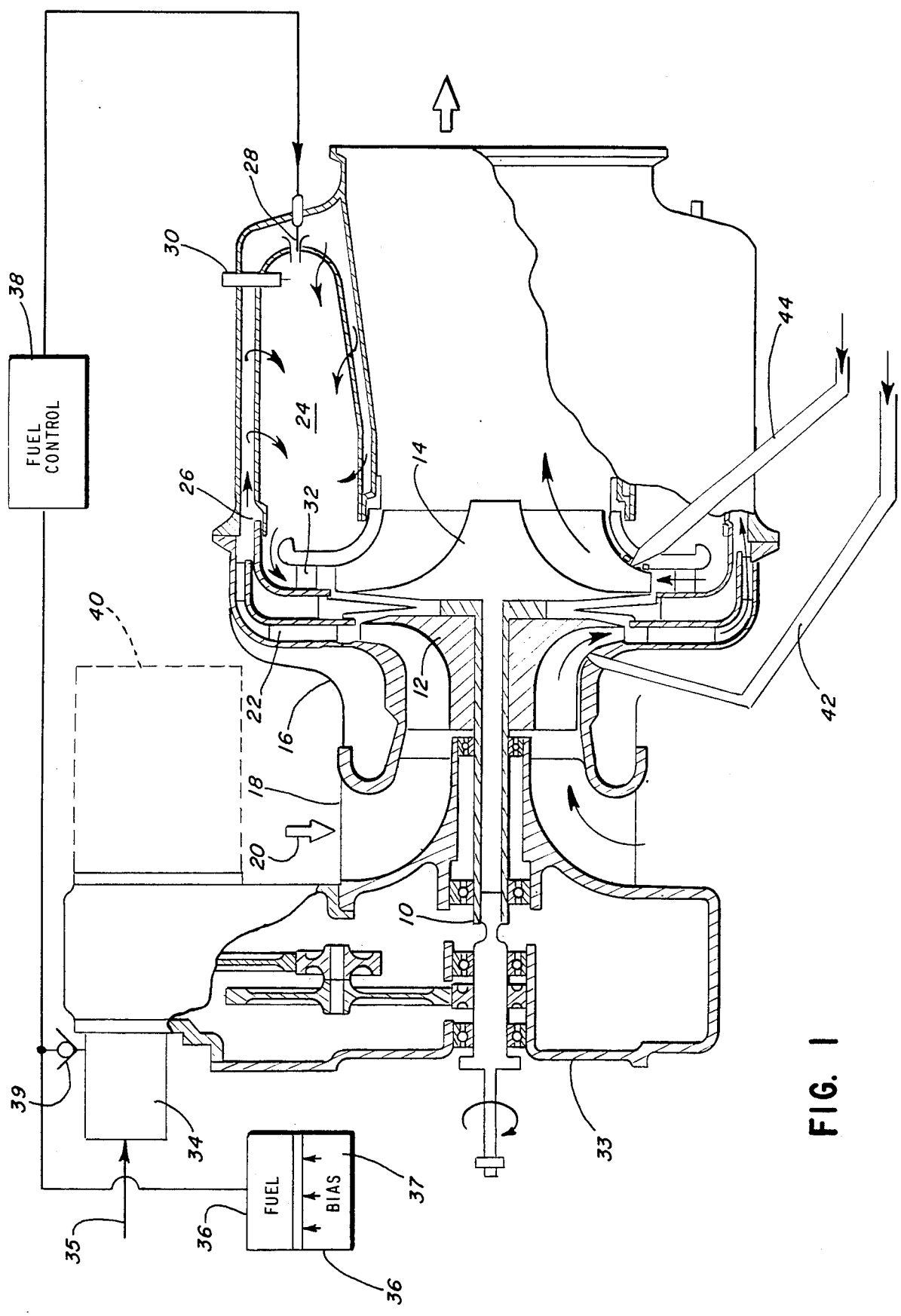
FIG. 1 is a sectional view of a gas turbine engine embodying the invention and also showing conventional starting means.

An exemplary embodiment of a gas turbine engine made according to the invention is illustrated in the drawings in the form of a radial flow compressor and turbine. However, it is to be understood that the principles of the invention may be employed with equal facility in an axial or mixed flow turbine as well, or in a two-shaft gas turbine engine.

The engine includes a shaft 10 mounting a compressor wheel 12 and a turbine wheel 14, both of conventional configuration. The compressor wheel 12 is surrounded by a housing component 16 having an inlet 18 through which inlet air may enter in the direction illustrated by an arrow 20.

The housing 16, just radially outward of the tip of the compressor wheel 12, includes a diffuser section 22 of a form to be described. Compressed air passes through the diffuser section 22 to be channeled to a combustion chamber 24 via an inlet 26 thereto. The combustion chamber 24 is also provided with a fuel injector 28 as well as an igniter 30. Just radially outward of the periphery of the turbine wheel 14, the combustion chamber 24 includes a combustion gas nozzle assembly 32.

As is well known, during operation of the apparatus, combustion of fuel within the combustion chamber 24 will provide combustion gas at an elevated pressure which is then expanded through the turbine wheel 14 to rotate the same. Such rotation is, of course, imparted to the shaft 10 which in turn drives the compressor wheel 12 to provide compressed air for combustion to the chamber 24.

The shaft 10 may also be coupled to a gear box 33 for power take-off purposes. Frequently, the gear box 33 may couple the shaft 10 to a fuel pump 34 or the like which provides pressurized fuel to a fuel control apparatus 38 which controls the injection of fuel via the injector 28 into the chamber 24.

The fuel pump 34 obtains fuel from an assumed unpressurized or low pressure fuel supply schematically shown by an arrow 35.

The fuel pump 34 will not provide high pressure fuel until shaft 10 rotation becomes sufficient, which is determined by the specific characteristics of the fuel pump 34. Therefore, the pressurized fuel for starting purposes can be provided by a small stored-energy accumulator 36, which contains a small amount of fuel and a biasing means 37 for expelling the fuel at a required pressure. The biasing means may be a pressurant gas or, in the alternative, a spring. The check valve 39 prevents the fuel from the accumulator 36 from flowing back through the fuel pump 34, but yet allows excess flow from the pump 34 during normal operation to recharge the accumulator 36 when sufficient shaft speed is reached. This accumulator feature is not part of the invention, but is rather a common arrangement when a pressurized fuel supply is otherwise unavailable prior to a start attempt. An electric-driven fuel pump, not connected to shaft 10, would be an alternate arrangement (not shown), and thus the start-fuel accumulator would not be required.

In conventional apparatus, the gear box 33 might mount a pneumatic, hydraulic or electric starter motor such as shown in dotted lines at 40. According to the invention, the motor 40 may be eliminated or its size substantially reduced.

Conventional apparatus may also include compressed gas inlets such as shown at 42 and 44. Such inlets act to direct gas under pressure against the blades of the compressor wheel 12 or the turbine wheel 14 to instigate rotation and accelerate the same for starting purposes. The compressed gas inlets 42 and 44 will generallay not both be used, it being preferred to use one or the other, and both may be eliminated according to the present invention or at the very least, have their capacities substantially reduced.

FIG. 2A and 2B illustrate one construction of the diffuser section 22 which may be generally along the line illustrated herein or as shown in my earlier U.S. Letters Pat. No. 3,957,392 issued May 18, 1976, the details of which are herein incorporated by reference. The diffuser section is made up of a plurality of fixed diffuser vanes 46 separated by passages 48. The compressor wheel includes impelling vanes 50 which direct compressed inlet air through the diffuser vanes 46 via the passages 48. The diffuser vanes 46 may also include movable diffuser vane components 52 pivotable about respective pivot axes 54. The movable diffusion vane components, under some circumstances, act as flapper valves.

They are arranged so as to abut the radially inner side of an associated vane 46 as shown at the left-hand side of FIG. 2A to provide for free flow of compressed air to the passages 48. At the same time, they may pivot about the pivot axes 54 to the position shown at the upper right portion of FIG. 2A whereat adjacent ones of the movable vane components 52 abut each other to act as flapper valves or check valves to prevent the flow of air or combustion gas from the combustion chamber 24 toward the compressor wheel 12. The movable vane components 52 will, of course, act in response to flow direction and pressure differential. Interestingly, however, when in the open position as illustrated in the left-hand side of FIG. 2A, they act as fully-opened zero loss flapper valves because the normal flow velocity is keeping the vanes in the position shown.

As will be seen, this configuration of movable vane components 52 is utilized during start-up of the turbine. It may also be utilized for the purposes set forth in greater detail in my previously referenced U.S. Letters Pat. No. 3,957,392.

In the embodiment illustrated in FIGS. 2A and 2B, each one of the movable vane components 52 operates independently of the others. In some instances, it may be desirable that all act in common and/or that they be biased to, for example, the open position. FIG. 3A and 3B show such a means. In this case, the pivot axis 54 of each of the movable vane components 52 includes a shaft 60 extending into a housing 62. Within the housing 62 a gear 64 is affixed to the shaft 60 and between adjacent movable vane components 52, there are disposed meshed idler gears 66. As a consequence, all of the movable vane components 52 are linked for conjoint movement. Where biasing of the movable vane components to a particular position is desired, a lever arm such as shown at 68 may be affixed to one of the idlers 66 and connected via a biasing spring 70 to some stationary portion 72 of the housing 16. As illustrated in FIG. 3A, the spring 70 is a tension spring and as such will tend to bias the movable vane components 52 toward an open position.

Figure 4A:
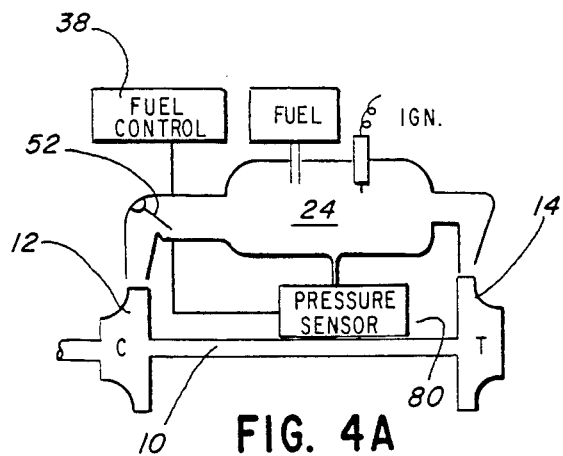
FIGS. 4A–4D, inclusive, illustrate various stages in the operation of the apparatus and/or performance of the inventive method.
Figure 4B:
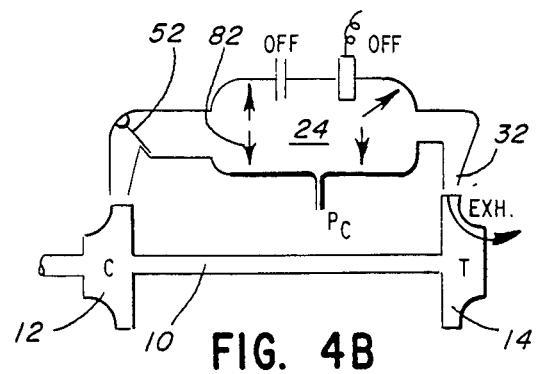
Figure 4C:
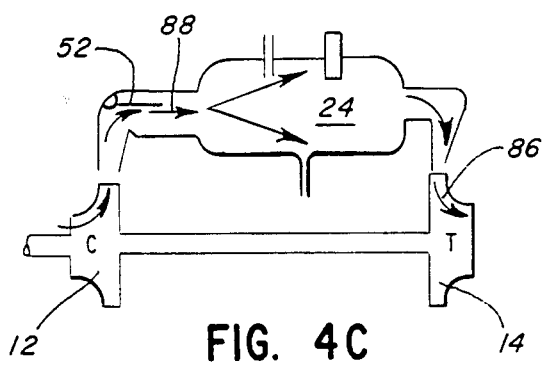
Figure 4D:
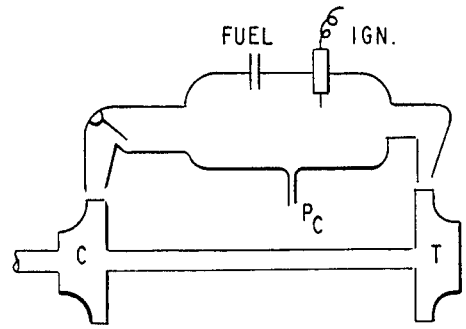
Figure 5:
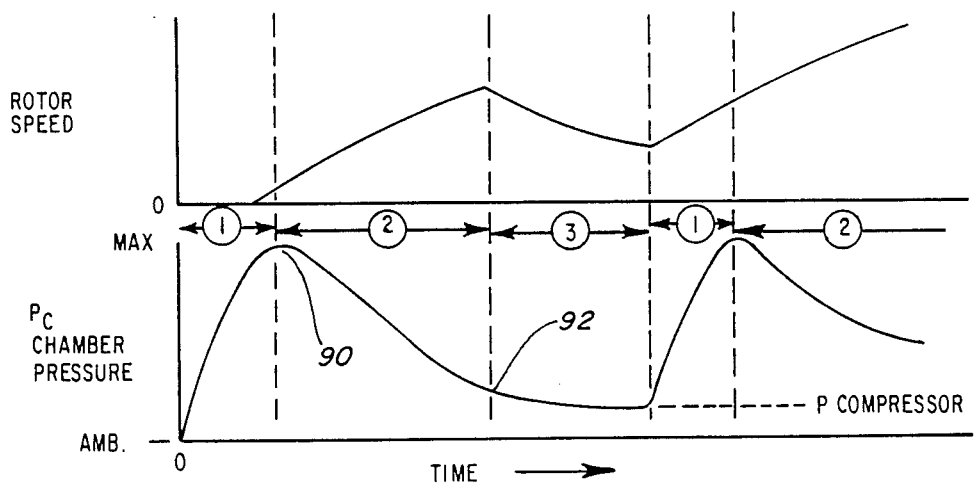
FIG. 5 graphs tubine rotor speed and combustion chamber pressure against time during a turbine starting cycle.

Turning now to FIGS. 4A-4D, inclusive and FIG. 5, the system is seen to include a pressure sensor 80 which senses the pressure within the combustion chamber 24 and conveys intelligence relative thereto through the fuel control.

When it is desired to start the engine, the fuel control 38 is appropriately signalled and the same will cause fuel to be introduced into the combustion chamber 24. As shown in FIG. 4B, such fuel is ignited and creates an increase in pressure within the chamber 24 as indicated by arrows 82. This increase in pressure will cause the movable vane components 52 to move to a closed position to prevent the flow of air or pressurized gas from the combustion chamber 24 back to the compressor wheel 12. Consequently, the only outlet for the pressurized gas is through the nozzle 32 to the turbine wheel 14. The pressurized gas impinges upon the turbine wheel 14 and during the course of expansion, drives the turbine wheel. This in turn drives the compressor wheel 12 by reason of them being coupled via shaft 10.

After the pressurized gas has been expanded through the turbine wheel 14, the inertial energy of the system will result in continued rotation of the compressor wheel 12. It will accordingly continue to compress inlet air and the pressure of the same at some point will exceed the decreasing pressure within the chamber 24. When this occurs, the movable vane components 52 will move to an open position such as illustrated in FIG. 4C. Compressed air will then enter the combustion chamber. The initial surge of such air will scavenge the combustion chamber 24 by driving spent combustion gas out through the turbine as illustrated by arrows 86. Subsequent incoming compressed air as indicated by arrows 88 will charge the combustion chamber 24 with a new charge of combustion air.

Following the recharging, the injection and ignition of fuel is then repeated as illustrated in FIG. 4D again followed by the steps of expansion and scavenging and recharcing.

FIG. 5 illustrates the occurence of these steps on a time basis. The lower part of FIG. 5 graphs the pressure within the combustion chamber against time. The fuel injection and ignition step occurs during the time period indicated as (1). Expansion of the pressurized combustion gas occurs during the time period indicated at (2). It is understood that during this time, fuel injection and ignition is halted.

Scavenging and recharging occurs during the time period indicated at (3). Ideally, control of the sytem can be sensed using the pressure sensor 80 to determine points of inflection in the pressure curve as occur at the points designated 90 and 92. In some cases, absolute pressure may be sensed while at others, it may be desirable to sense the rate of change in pressure or even a pressure differential. In some instances, once the point 92 is sensed, a preset time period is set to elapse before the next fuel injection and combustion period is to occur and the fuel control 38 and the ignitor 30 provides the means for accomplishing the same as desired.

FIG. 5 also illustrates the rotor or shaft speed of the device during the corresponding points in time. It will be observed that the scavenging and recharging step makes use of only a portion of the inertial energy imparted to the turbine during the preceding expansion step. In this way, the rotor speed is gradually "jacked" up to a rate at which the turbine is self-sustaining. At such a point, a conventional Brayton cycle operation of the enginge may be employed or the pulsating, semi-constant volume operation can be continued to maintain speed and provide excess shaft power simultaneously.

From the foregoing, it will be appreciated that an engine made according to the invention provides the means of eliminating heavy and/or voluminous attached or auxiliary equipment customarily employed for the starting of gas turbine engines. At the same time, the valve means in the form of the movable vane components 52 employed to prevent backflow of gas during fuel injection and ignition as well as gas expansion steps in the starting method are useful to prevent surging not only during start-up but at other times during a more conventional operation of the engine.

What is claimed is:

1. A gas turbine engine comprising:
    a rotatable compressor wheel;
    a rotatable turbine wheel;
    means coupling said wheels for conjoint rotation;
    a combustion chamber having an air inlet disposed to receive compressed air from said compressor wheel, a fuel inlet for receipt of fuel to be oxidized, and a combustion gas outlet disposed to provide combustion gas under pressure to said turbine wheel to rotate the same;
    valve means between said compressor wheel and said combustion chamber to said compressor wheel; and
    means for starting said engine including means for periodically injecting and combusting fuel in said chamber so as to create a pressurized gas therein and thereafter halting the injecting and combustion of fuel in the chamber so as to allow the pressurized gas to expand through said turbine wheel to accelerate the same followed by pressurization of air by said compressor wheel and opening of said valve means so that compressed air scavenges and recharges said combustion chamber, said valve means comprising a flapper valve acting as a check valve and including plural flappers, each defined by a movable part of a diffuser vane.

2. A method of starting a gas turbine engine having a turbine wheel mechanically coupled to a compressor and a combustion chamber provided with compressed air for combustion by the compressor and providing combustion gas under pressure to the turbine wheel to drive the same and thus drive the compressor, comprising the steps of:
    (a) combusting fuel in the combustion chamber for a limited period of time sufficient to provide combustion gas under pressure;
    (b) accelerating the turbine wheel and the compressor by expanding the gas from step (a) through the turbine wheel;
    (c) preventing the flow of combustion gas to said compressor during the performance of steps (a) and (b);
    (d) following step (b), utilizing a portion of the inertial or kinetic energy of the accelerated turbine wheel and compressor to provide sufficient compressed air to the combustion chamber to (1) scavenge and (2) recharge the same; and
    (e) repeating steps (a)–(d) inclusive until operation of the engine becomes self-sustaining.

3. The method of claim 2 wherein step (c) is performed with as valve means disposed between said compressor and said combustion chamber.

4. The method of claim 2 wherein step (c) is performed with movable diffuser vanes disposed between said compressor and said combustion chamber.

* * * * *